United States Patent
Gilliland et al.

[11] Patent Number: 6,037,688
[45] Date of Patent: Mar. 14, 2000

[54] MOTOR HOUSING ASSEMBLY HAVING MATING RAMPED SURFACES WITH A DIFFUSER PLATE FOR IMPROVED AIR FLOW

[75] Inventors: Michael L. Gilliland; Robert A. Ciccarelli; Michael Coles, all of Kent, Ohio

[73] Assignee: Ametek, Inc., Kent, Ohio

[21] Appl. No.: 09/020,718

[22] Filed: Feb. 9, 1998

Related U.S. Application Data

[63] Continuation of application No. 08/554,934, Nov. 9, 1995, Pat. No. 5,734,214.

[51] Int. Cl.[7] .................................................. H02K 5/16
[52] U.S. Cl. ..................... 310/89; 415/211.2; 415/209.2; 417/423.14
[58] Field of Search .............................. 310/89, 179, 194, 310/258; 415/200, 208.1, 211.2, 213.1, 209.2, 208.2; 417/366, 368, 369, 423.14

[56] References Cited

U.S. PATENT DOCUMENTS 4,057,370  11/1977  Numata et al. ........................... 417/366

FOREIGN PATENT DOCUMENTS

| | | |
|---|---|---|
| 0 023 609 A1 | 7/1980 | European Pat. Off. . |
| 0 552 978 A2 | 1/1993 | European Pat. Off. . |
| 3802890 A1 | 8/1989 | Germany . |
| 63-109300 | 5/1988 | Japan ..................................... 417/366 |
| 3138492 | 6/1991 | Japan . |
| 6123297 | 5/1994 | Japan . |

*Primary Examiner*—Nestor Ramirez
*Assistant Examiner*—Karl Imayoshi E. Tamai
*Attorney, Agent, or Firm*—Renner, Kenner, Greive, Bobak, Taylor & Weber

[57] ABSTRACT

A molded through-flow motor assembly has a motor housing, including a cup portion and a flange portion. The flange portion includes a plurality of ramp surfaces extending outwardly therefrom. The cup portion has a field retaining wall and guide rib extending inwardly therefrom on opposite sides of the housing. A diffuser plate is provided having a plurality of scalloped ramp surfaces on a first side thereof adjacent to a plurality of air inlet apertures which open into air chambers on the second side thereof. The field and armature portions of a motor assembly are mounted in the motor housing and the diffuser plate is fitted to the flange portion of the housing such that the ramp surfaces abut one another to form a continuous ramp surface from each air inlet aperture into the air chambers. A rotating fan member is mounted to the armature shaft and is housed within a shroud cover fitted to the motor housing. In operation, air is directed through the shroud cover by the rotating fan and into the air chambers by way of the air inlet apertures and ramp surfaces. Air is directed over the field and armature assemblies and out through vent cutouts in the cup portion of the housing.

4 Claims, 4 Drawing Sheets

6,037,688

MOTOR HOUSING ASSEMBLY HAVING MATING RAMPED SURFACES WITH A DIFFUSER PLATE FOR IMPROVED AIR FLOW

This application is a continuation of application Ser. No. 08/554,934, now U.S. Pat. No. 5,734,214, filed Nov. 9, 1995, which is incorporated herein by reference.

TECHNICAL FIELD

The invention herein resides in the art of dynamo-electric machines such as motors and generators. More particularly, the invention relates to through-flow motor assemblies such as are used in canister applications, wherein working air is used for motor cooling. Specifically, the invention relates to molded motor housings and diffuser systems for such through flow motors.

BACKGROUND ART

Heretofore, it has been known to use electric motors for numerous applications. It has been found that such motors are particularly suited to small blowers, fans, or compressors such as are used in canister applications.

It has previously been known to use so called through-flow configurations which allow all or a portion of the working air from the primary fan to be directed through the motor housing to cool the motor, thus eliminating the need for a separate cooling fan. Such configurations are desirable for size and economy as well as efficiency. The problem with such systems is in lost efficiency due to transition of air moving from the rotating fan as it is directed through the motor housing.

Another problem in previous through-flow motor designs has arisen due to the skeletal frame designs typically used in such systems. These frames are frequently metal and accordingly require additional materials for brush mechanisms and terminations. The additional parts in skeletal frame construction allow for misalignment and improper fit between the commutator and brushes as well as between the field and armature rotor. Accordingly, it is most desirable to obtain a motor housing for a through-flow motor which is lightweight, compact and relatively inexpensive to manufacture, as well as being more efficient.

DISCLOSURE OF INVENTION

In light of the foregoing, it is an aspect of the invention to provide a molded through-flow motor assembly.

Another aspect of the invention is the provision of a through-flow motor assembly having a molded motor housing.

A further aspect of the invention is the provision of a diffuser plate which, in combination with the molded motor housing, provides an efficient transition of air through the motor.

An additional aspect of the invention is the provision of a motor housing having guides for alignment of the motor field, brushes, and armature.

Still another aspect of the invention is the provision of a through-flow motor assembly which requires fewer parts than comparable motors of the prior art, is inexpensive to manufacture, and can be implemented with existing techniques and equipment.

The foregoing and other aspects of the invention which will become apparent as the detailed description proceeds are achieved by the improvement in a molded through-flow motor assembly having a rotating fan member mounted on a motor shaft, the fan being enclosed in a shroud cover, the improvement comprising: housing means for maintaining the motor field in a fixed position; and, diffuser means affixed to said housing means for directing the flow of air from the fan member over the motor.

Other aspects of the invention are attained by a through-flow motor housing and diffuser assembly, comprising: a motor housing having a generally cylindrical cup portion, said cup portion having a circumferential sidewall and a substantially open end, field retaining means disposed within said cup portion, and a circumferential flange portion extending from said cup portion around said open end, said flange portion having a plurality of vanes extending therefrom; and, a diffuser plate, adapted to engage said flange portion, said diffuser plate having first and second sides, a plurality of scalloped ramp surfaces on said first side, a plurality of air inlet apertures penetrating from said first side to said second side, a shaft aperture also penetrating from said first side to said second side, and a plurality of curvilinear vanes radiating from said shaft aperture toward said air inlet apertures on said second side.

Still other aspects of the invention are attained by a molded through-flow motor assembly, comprising: a motor having a field section and an armature section, said armature section having a shaft portion; a rotating fan member mounted on said shaft portion; a motor housing having a generally cylindrical cup portion, said cup portion having a circumferential sidewall and a substantially open end, field retaining means disposed within said cup portion, and a circumferential flange portion extending from said cup portion around said open end, said flange portion having a plurality of vanes extending therefrom, said field retaining means comprising at least two field retaining walls extending inwardly from said circumferential wall, said field retaining wall having an abutment surface; a diffuser plate adapted to engage said flange portion, said diffuser plate having first and second sides, a plurality of scalloped ramp surfaces on said first side, a plurality of air inlet apertures penetrating from said first side to said second side, a shaft aperture also penetrating from said first side to said second side, and a plurality of curvilinear vanes radiating from said shaft aperture toward said air inlet aperture on said second side so that adjacent curvilinear vanes form an expanding air chamber therebetween from said air inlet apertures toward the center of said plate and said vanes of said flange portion include a plurality of ramp surfaces adapted matingly to engage said ramp surfaces of said diffuser plate so as to form a continuous ramp surface within each of said air chambers; and a fan shroud having a circumferential sidewall, an open end, and a generally closed end, said closed end having an air intake aperture therein.

BRIEF DESCRIPTION OF THE DRAWINGS

For a complete understanding of the objects, techniques, and structure of the invention, reference should be made to the following detailed description and accompanying drawings wherein.

BEST MODE FOR CARRYING OUT THE INVENTION

Figure 1:
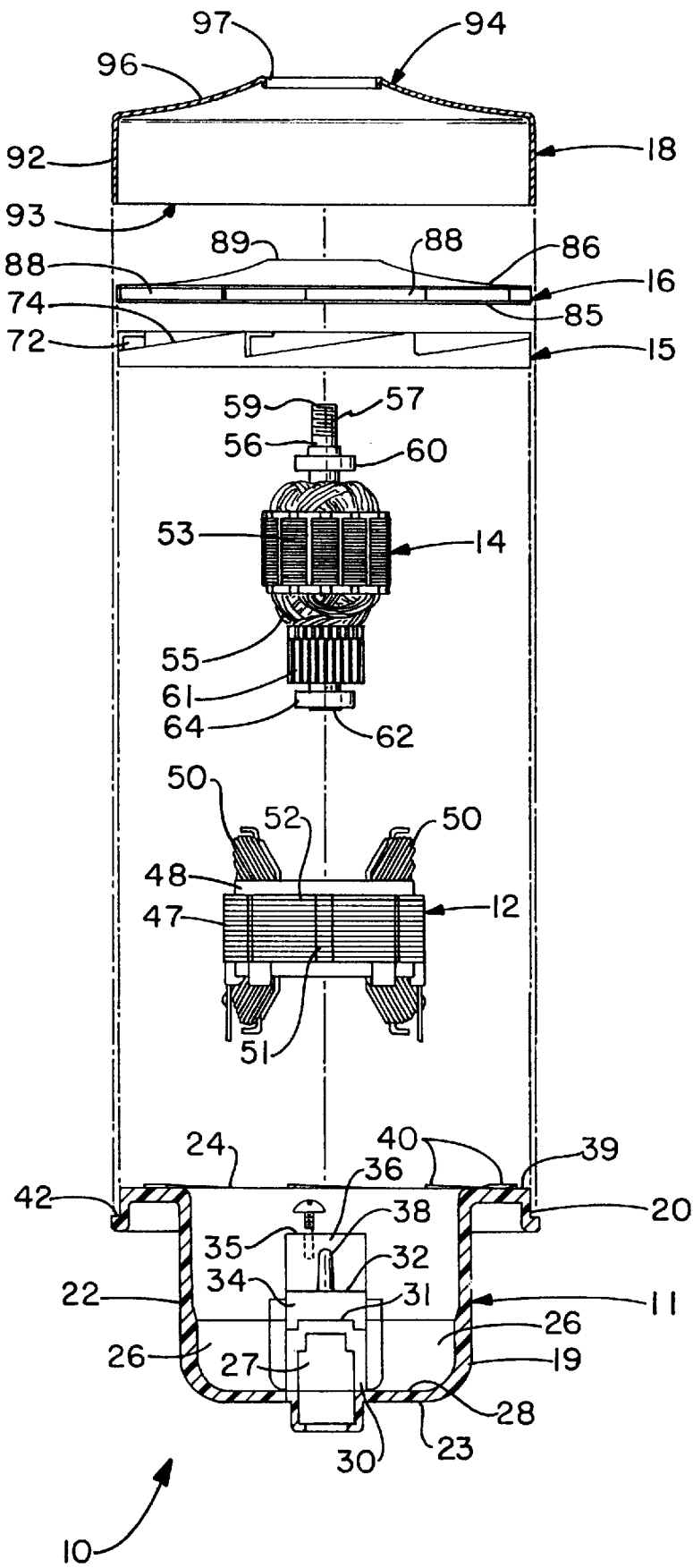
FIG. 1 is an exploded elevational side view of the motor assembly according to the invention.

Referring now to the drawings, it can be seen that a motor assembly according to the invention is designated generally by the numeral 10. While it will be appreciated that the concept of the invention is applicable to any number of various dynamo-electric devices, the description herein will be with respect to a motor assembly of the nature shown. As such, the assembly 10 includes a motor housing 11, a field assembly 12, an armature assembly 14, a diffuser plate 15, a rotating fan member 16, and a shroud cover 18.

With reference now to FIGS. 1–4, it can be seen that the motor housing 11 accordingly to the invention generally includes a cylindrical cup portion 19 and a flange portion 20. It will be noted that the cup portion 19 includes a circumferential sidewall 22, a generally closed bottom end 23 and a substantially open top end 24. The flange portion 20 extends outwardly from the circumferential sidewall 22 so as to surround the open top end 24. As can be seen the cup portion 19 is characterized by a plurality of vent cut-outs 26 proximal to the bottom end 23 of the housing 11. As shown, each vent cut-out 26 is located adjacent to a brush holder cavity 27. Accordingly, the vent cut-outs 26 are defined by the brush holder walls 30 on one side and by web portions 28 on the other.

The brush holder cavities 27 are disposed on opposite sides of the housing 11, and are adapted to receive brushes (not shown) so as to maintain the brushes in contacting engagement with the commutator when the motor is assembled. The brush holder cavities 27 are defined by a pair of sidewalls 30 extending inwardly from the circumferential wall 22 of the housing 11. A top wall 31 connects the sidewalls 30 so as to form a generally rectangular cavity. As can be seen the top wall 31 extends back toward the circumferential sidewall 22 to a field seat 32. The field seat 32 is formed by a first wall 34 extending generally upwardly from the top wall 31 of the brush holder cavity 27 and further by a short second wall 35 which extends toward the circumferential sidewall 22 of the housing 11. This short second wall 35 terminates at a field retaining wall 36 which includes a longitudinal field guide rib 38.

Figure 4:
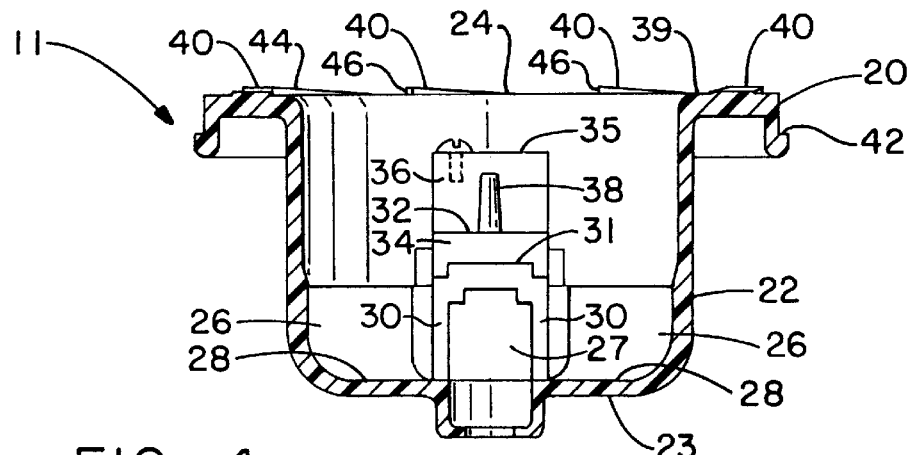
FIG. 4 is a cross sectional view of the housing as taken at line 4—4 of FIG. 3.
Figure 5:
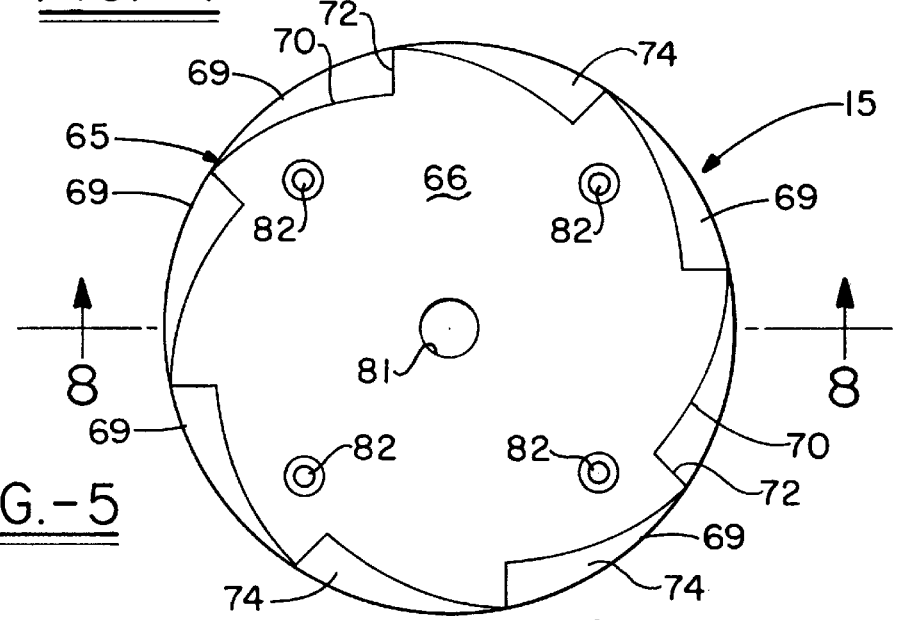
FIG. 5 is a top plan view of the diffuser plate according to the invention.
Figure 6:
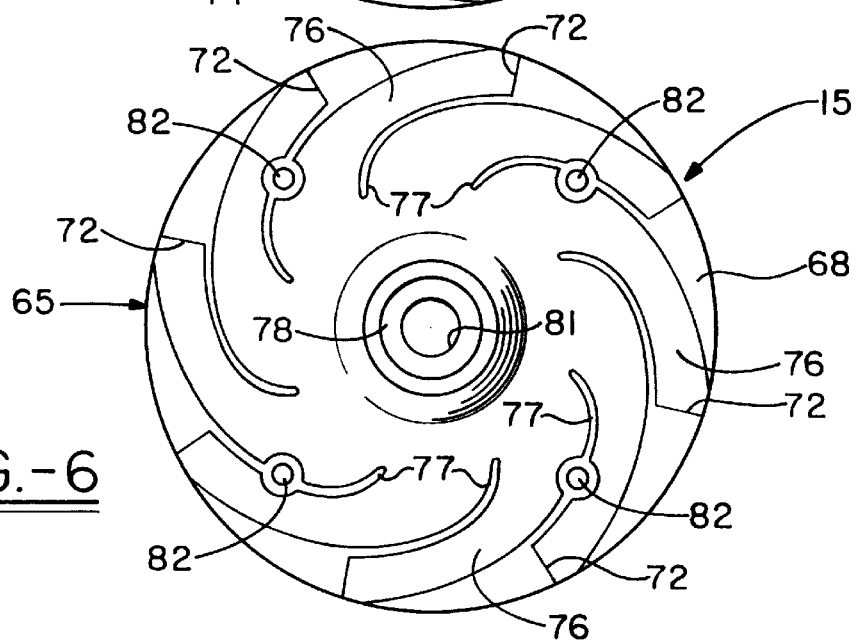
FIG. 6 is a bottom plan view of the diffuser according to the invention.
Figure 7:
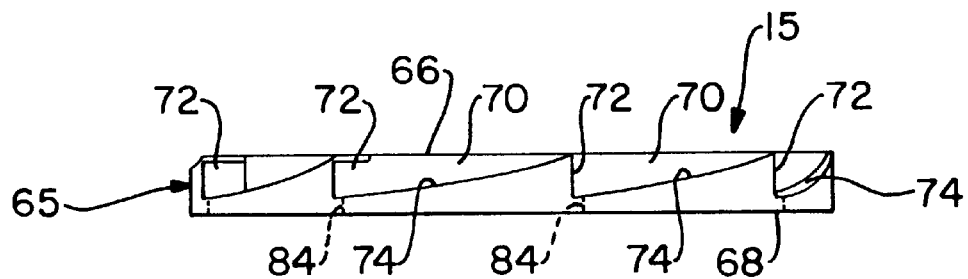
FIG. 7 is an elevational side view of the diffuser plate.
Figure 8:
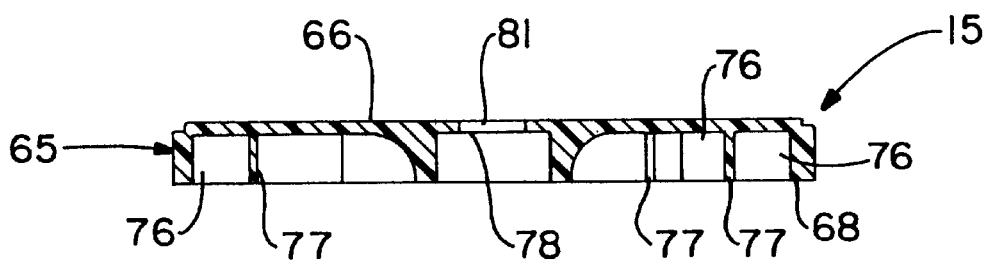
FIG. 8 is a cross section of the diffuser plate of FIG. 5 taken along the line 8—8; and, FIG. 9 is a schematic view of the assembly according to the invention showing the direction of air flow through the assembly.

The flange portion 20 of the housing 11 includes an upper face 39 having a plurality of tapered ramp surfaces extending upwardly therefrom. The ramp surfaces 40 are distributed at equally spaced intervals along a common radius on the flange face 39. The flange portion 20 also includes a stepped shroud seat 42 which is disposed around the outer circumference of the flange 20. For reasons which will become apparent as the description continues the flange 20 further includes a plurality of fastener apertures 43 in the face 39 thereof. With particular reference to FIGS. 1 and 4 it can be seen that the ramp surfaces 40 are oriented curviliniarly along a common radius of the flange face 39 and include a tapered upper surface 44 which extends from the generally flat flange face 39 to a ramp face 46. The ramp face 46 is oriented generally perpendicular to the flange face 39 and defines the leading edge of each ramp surface 40.

Figure 2:
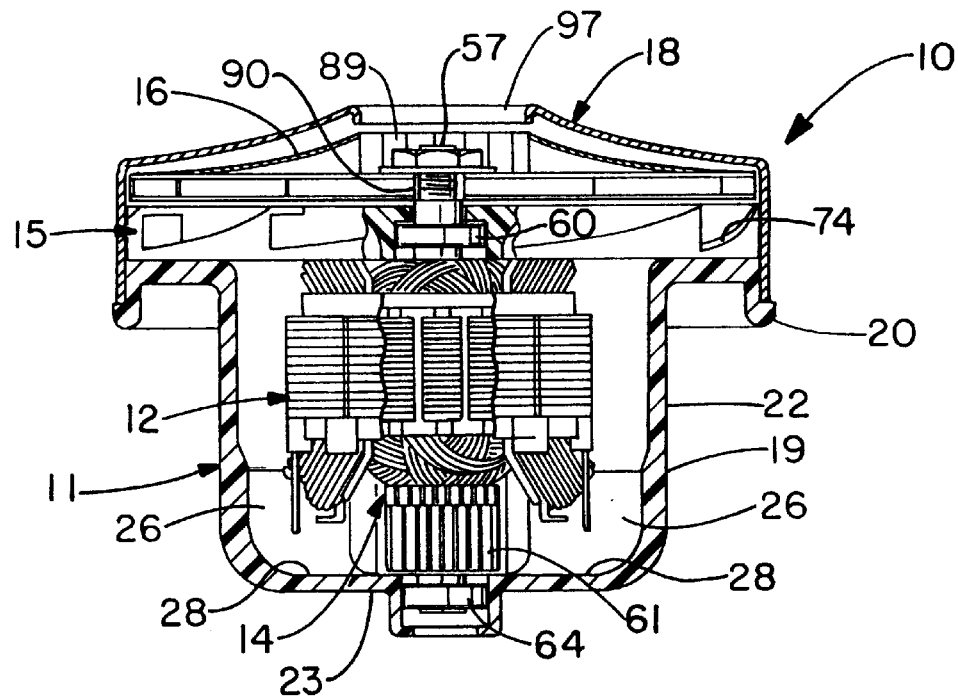
FIG. 2 is an elevational cross section of the assembly.
Figure 3:
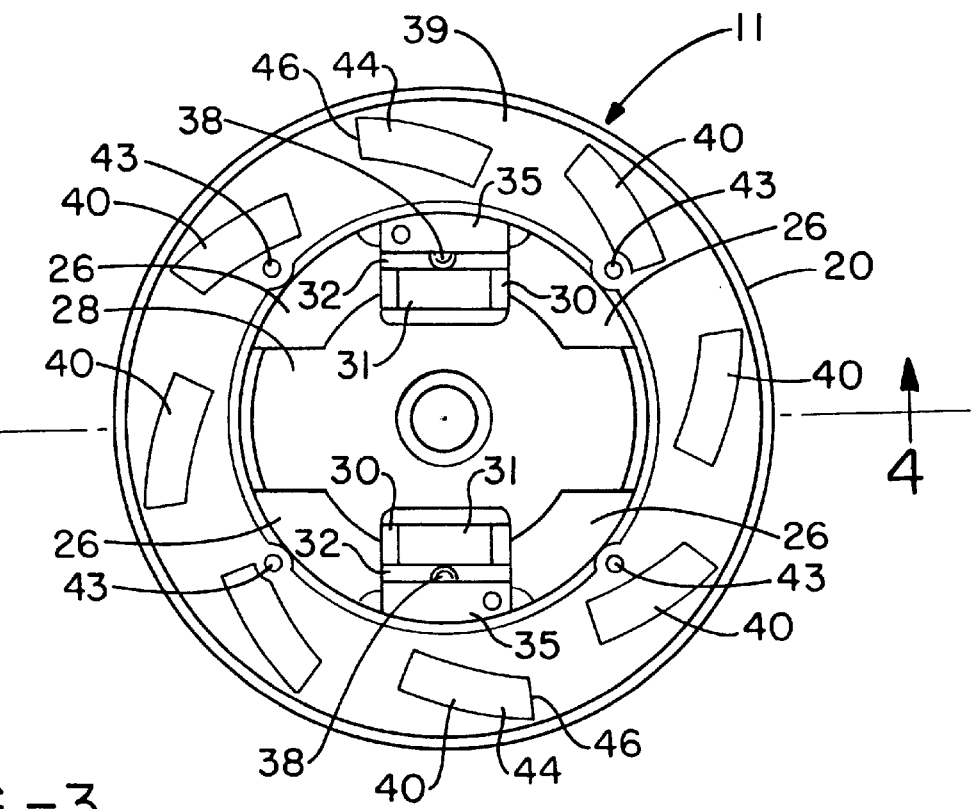
FIG. 3 is a top plan view of the motor housing according to the invention.

With continued reference to FIGS. 1 and 2, it can be seen that the field assembly 12 is comprised generally of a plurality of stacked lamination plates 47, coil support boards 48, and a plurality of coil windings 50. As can be seen, the coil support boards 48 are received within the laminations 47 and the windings 50 are wound around the coil support boards 48 and laminations 47 in a conventional manner disposed within the coil support boards 48. Those skilled in the art will recognize that a novel aspect of the present invention is the provision of guide slots 51 in the exterior surface 52 of the laminations 47. As shown, the guide slots 51 are perpendicularly centered on opposite sides of the laminations 47 in the exterior surface 52 thereof. The guide slots 51 may be of a semicircular configuration as shown or other appropriate configurations so as to correspond with the guide ribs 38 of the housing 11 as will be further described hereinbelow.

The armature assembly 14 is of a generally conventional design having a plurality of lamination plates 53 within which are wound armature coils 55. A generally elongated shaft member 56 is disposed longitudinally through the armature winding 55 and may include a threaded fan engaging portion 57 at a first end 59 thereof. The shaft 56 is journaled in a bearing 60 which is fitted on the shaft 56 proximal to the first end 59 thereof. A commutator 61 is similarly disposed on the shaft 56 proximal to a second end 62 thereof. The commutator 61 is connected to the armature windings 55 in a conventional manner. A second bearing 64 is disposed on the second end 62 of the shaft 56.

Referring now to FIGS. 5–8, it can be seen that the diffuser plate 15 is comprised generally of a disk shaped main body portion 65 having a first side 66 and a second side 68. The outer periphery of the diffuser plate 15 is interrupted by a plurality of curvilinear scallops 69. Each scallop 69 is defined by a curvilinear wall 70 which extends from the outer periphery of the diffuser plate 15 radially inwardly and terminates at an air inlet aperture 72. The air inlet apertures 72 penetrate from the first side 66 of the plate 15 to the second side 68 thereof. It should further be noted that the curved wall 70 increases in depth from the outer periphery of the diffuser plate 15 to the air inlet aperture 72. As such, a curvilinear ramp surface 74 is formed immediately in front of each air inlet aperture 72. Each ramp surface 74 descends and widens from one air inlet aperture 72 to the next. That is, where one scallop 69 ends the next begins, so as to form a continuous array of scallops 69 about the plate circumference. On the second side 68 of the plate 15, obverse from each scallop 69, the air inlet apertures 72 open into air chambers 76 which are defined by a plurality of curviliniarly extending walls 77 which radiate from a bearing holder 78 at the center of the plate 15 toward each air inlet aperture 72. As can be seen, the bearing holder 78 is defined by a generally cylindrical wall member 80 extending from the second side 68 of the plate 15. A shaft aperture 81 is centered within the bearing holder 78 and penetrates from the first side 66 to the second side 68 of the diffuser plate 15. Similarly, a plurality of fastener apertures 82 are provided in the diffuser plate 15 at locations corresponding with the fastener apertures 43 of the housing 11 for reasons which will become apparent as the description continues. It will be noted that the curved walls 70 of the scallops 69 never reach a depth equal to the thickness of the main body member 65. As such, a small step 84 is created at the end of each ramp surface 74 at the air inlet aperture 72. For reasons which will become apparent, the height of the step 84 is approximately equal to the depth of the ramp face 46 of the motor housing 11.

As shown in the drawings, the rotating fan member 16 is of a conventional design having a generally annular disk member 85 and a frusto-conical ring member 86. A plurality of the tapered vanes 88 are interposed between the disk 85 and ring 86 in a radial pattern extending generally from the center of the ring member 86 toward the outer periphery thereof. An air inlet aperture 89 is provided centrally in the ring member 86 while a shaft aperture 90 is similarly provided in the disk member 85.

The shroud cover 18 of the invention is of a generally cylindrical cup shaped configuration having a circumferential sidewall 92, an open end 93, and a substantially closed end 94. The substantially closed end 94 of the shroud 18 is defined by a tapered end wall 96 having a central air intake aperture 97 therein. For reasons which will become apparent, the inside diameter of the circumferential sidewall 92 of the shroud 18 is of approximately the same dimension as the shroud seat 42 of the housing 11.

Referring again to FIGS. 1 and 2, assembly of the device according to the invention is established by first fitting the field assembly 12 into the motor housing 11 such that the outer surface 52 of the field laminations 53 matingly abuts the field retaining wall 36 of the housing 11. The guide slots 51 of the field assembly 12 are aligned with the guide ribs 38 of the housing 11 and the field assembly 12 is allowed to rest against the field seat 32 just above the brush holder cavities 27. The field assembly 12 may then be secured within the housing 11 by way of appropriate fasteners such as truss bolts or the like. The armature assembly 14 is then inserted such that the bearing 64 proximal to the second end 62 resides in the bearing holder 25 at the bottom end 23 of the housing 11. Accordingly, the armature core is centered within the field assembly 12 while the commutator 61 is in close proximity to the brush holder cavities 27. With the armature in place the diffuser plate 15 may be fitted to the flange face 39 of the motor housing 11 such that the ramp surfaces 40 are located within the air chamber 76 of the diffuser plate 15. It should be noted that the ramp face 46 of the ramp surfaces 40 abuts the step 84 of the ramp surfaces 74 of the diffuser plate 15. Inasmuch as the ramp face 46 and step 84 are of a corresponding height, a continuous ramp surface is established between the ramp surfaces 74 of the diffuser plate 15 and the ramp surfaces 40 of the housing 11.

The bearing 60 proximal to the first end 59 of the armature shaft 56 resides in the bearing holder 78 of the diffuser plate 15, such that the threaded flange engaging portion 57 of the shaft 56 extends through the shaft aperture 81 of the plate 15. The diffuser plate 15 is secured to the housing 11 by way of appropriate fasteners such as machine screws received within the fastener apertures 43 and corresponding apertures 82 of the housing 11 and plate 15 respectively. The rotating fan member 16 may then be fitted to the armature shaft 56 by securing the disk 85 to the threaded fan engaging portion 57 of the shaft with appropriate spacers and/or nuts. The shroud cover 18 may then be fitted over the rotating fan 16 and diffuser plate 15 so as to frictionally engage the shroud seat 41 of the housing 11. It should be noted that the plate 15 may be secured to the housing 11 by staking. With the brushes installed in the brush holder cavities 27 and other appropriate electrical connections established the assembly 10 is now ready for operation.

Figure 9:
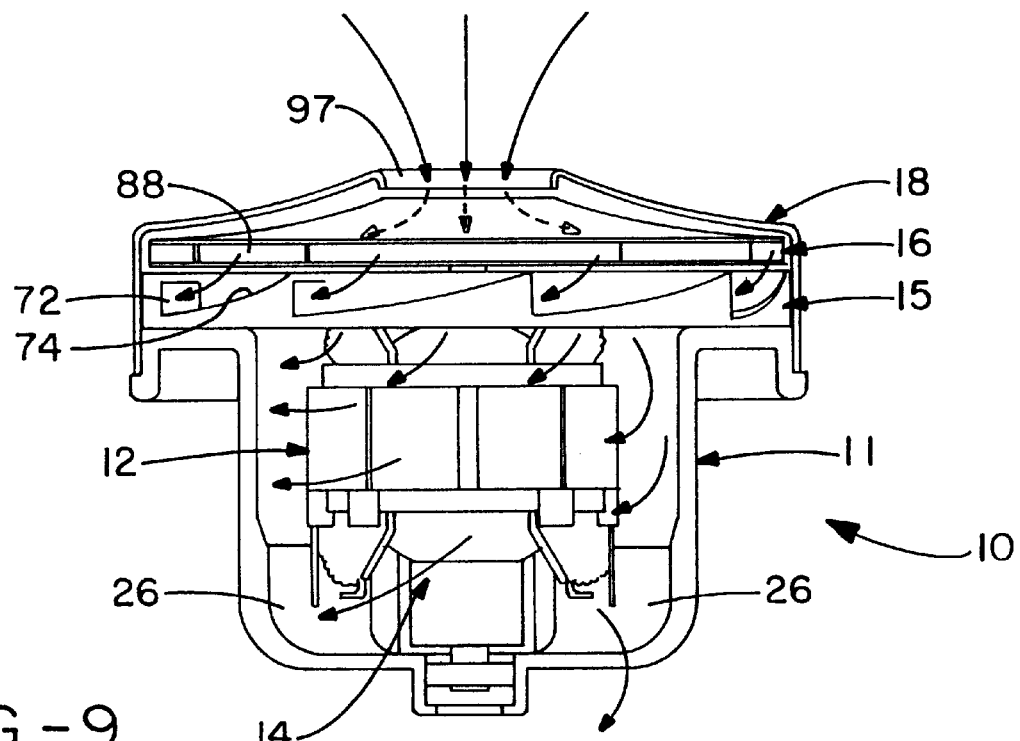

In operation, the motor is energized causing the rotating fan member 16 to begin to rotate within the shroud cover 18. As such, air is directed through the intake aperture 97 of the shroud 18 into the air intake aperture 89 of the rotating fan 16 as shown in FIG. 9. The air is then directed outwardly by the vanes 88 of the rotating fan 16 to the outer periphery of the fan. The air coming off the rotating fan member 16 is then directed down the ramp surfaces 74 of the diffuser plate 15 through the air inlet apertures 72 and down the ramp surfaces 40 of the housing 11 into the air chambers 76. It should be noted that the width of the air chambers 76 of the diffuser plate 15 increases gradually from the inlet aperture 72 toward the bearing holder 78. Accordingly, the compressed air is allowed to expand as it is directed toward the bearing holder 78 and pass over the field 12 and armature assemblies 14. The air coming off the field 12 and armature assemblies 14 is then passed through the vent cut-outs 26 of the housing 11. As presented above, it should be appreciated that the assembly 10 allows working air coming off the rotating fan member 16 to further serve to cool and ventilate the motor while maintaining an efficient flow of air.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. In combination, a motor housing and a diffuser plate, wherein a shroud having an air intake aperture therethrough encloses a portion of the motor housing and a fan adjacent the diffuser plate, the combination comprising:

a motor housing having a cylindrical cup portion, a circumferential flange portion extending from said cup portion, and a plurality of flange ramp surfaces extending from said flange portion, each said flange ramp surface having a ramp face extending from said flange portion; and a diffuser plate having a main body portion with a first side opposite a second side, said main body portion having a plurality of scallops disposed around an outer periphery of said first side which terminate at an air inlet aperture that extends through to said second side, each said scallop providing a diffuser ramp surface that terminates at a step, said diffuser plate mating with said motor housing such that said ramp faces are respectively positioned adjacent said steps to form continuous ramp surfaces from said plurality of flange ramp surfaces and said plurality of diffuser ramp surfaces.

2. The combination according to claim 1, wherein each said flange ramp surface extends from an outer periphery of said flange portion to an inner periphery of said flange portion displaced from said outer periphery.

3. The combination according to claim 1, wherein each said scallop has a curve wall on said first side that extends into a curvilinearly extending wall on said second side that is adjacent a corresponding said flange ramp surface, wherein said flange ramp surfaces and adjacent said curvilinearly extending walls form air chambers.

4. The combination according to claim 3, further comprising:

a bearing holder extending from said second side and surrounding said shaft aperture, said bearing holder having a radius transition to said second side.

* * * * *